United States Patent
Ramsey et al.

(10) Patent No.: US 8,208,203 B1
(45) Date of Patent: Jun. 26, 2012

(54) SYSTEM AND METHOD FOR A COELOSTAT WITH LARGE FIELD OF REGARD OPTICS

(75) Inventors: Perry Ramsey, Fort Wayne, IN (US); David Ball, Columbia City, IN (US); Paul Griffith, Fort Wayne, IN (US); David Edwin Lund, Fort Wayne, IN (US); Donald David Gregory, Fort Wayne, IN (US); Loren Woody, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 766 days.

(21) Appl. No.: 12/341,132

(22) Filed: Dec. 22, 2008

(51) Int. Cl.
G02B 23/00 (2006.01)
G03B 21/00 (2006.01)

(52) U.S. Cl. ......................................... 359/399; 353/3
(58) Field of Classification Search .................. 359/399; 353/3
See application file for complete search history.

(56) References Cited

U.S. PATENT DOCUMENTS

| | | | |
|---|---|---|---|
| 3,999,832 A | 12/1976 | Schlesinger | |
| 4,362,354 A | 12/1982 | Hager | |
| 4,883,348 A | 11/1989 | Spivey et al. | |
| 5,107,369 A | 4/1992 | Hendrickson et al. | |
| 5,115,355 A | 5/1992 | Dunn | |
| 5,654,549 A * | 8/1997 | Landecker et al. | 250/332 |
| 6,873,407 B2 | 3/2005 | Vogel | |
| 7,145,648 B2 | 12/2006 | Vogel | |
| 2006/0171022 A1 * | 8/2006 | Lundgren | 359/366 |

OTHER PUBLICATIONS

A. A. Mills, "Heliostats, Siderostats, and Coelostats: A Review of Practical Instruments for Astronomical Applications", British Astronomical Association Journal, vol. 95, No. 3, 1985, pp. 94-97.*
Smith and Ross, "Atomic Rockets: Space Stations", article, [online], [retrieved on Apr. 28, 2011]. Retrieved from Internet <URL: http://www.projectrho.com/rocket/spacestations.php>.*
Atlantic Positioning Systems, "SPS-4000 Precision Ppositioners,".

* cited by examiner

Primary Examiner — Alessandro Amari
(74) Attorney, Agent, or Firm — RatnerPrestia

(57) ABSTRACT

An optical imaging system includes a non-gimbaled telescope attached to a platform configured for outer-space orbit. Attached to the platform is a coelostat that is positioned in front of the aperture of the telescope. The coelostat includes two connected mirrors. Mirror one receives light from a scene of interest and mirror two receives light from the first mirror and transfers that light to the aperture of the telescope. The coelostat rotates 360 degrees around the azimuth axis. Additionally, mirror one rotates around the elevational axis to provide the entire system with a large field of regard.

17 Claims, 3 Drawing Sheets

SYSTEM AND METHOD FOR A COELOSTAT WITH LARGE FIELD OF REGARD OPTICS

TECHNICAL FIELD

The present invention relates to space borne, optical payloads having a large field of regard. More specifically, the present invention relates to mounting a coelostat to a space borne, hard-mounted large telescope allowing a large field of regard.

BACKGROUND OF THE INVENTION

In recent years, launching optical imaging systems into orbit has become an important field of endeavor. Having optical imaging systems located in orbit has allowed numerous advancements in the exploratory sciences, as well as practical applications such as military defense systems and commercial mapping and navigation systems. In general, these optical imaging systems include a telescope, a detector array and housekeeping subsystems necessary to gather and store the optical data. The optical imaging system is placed in a space borne orbit as a payload attached to a spacecraft. The spacecraft provides the instrument with positional stability, power, and thermal management.

Launching an optical imaging system into space is expensive and, therefore, it is a desirable to have systems with as little mass as possible to reduce launch costs. Unfortunately, most of these optical imaging systems include telescopes that are large and massive, having weights of 500 pounds and more.

Another factor limiting the lifetime of these optical imaging systems is the loss of power in the spacecraft. Therefore, the less power used in operating the optical imaging system, the less drain there is on the power supply of the spacecraft. Less drain on the power supply typically results in a longer lifetime for the imaging system.

In addition to the need for power conservation and efficiency, another important feature of an optical imaging systems is its Field of Regard (hereinafter "FOR"). The FOR is a combination of the individualized scenes that a telescope may see during a specific period. The individualized scenes are referred to as the Field of View (hereinafter "FOV"). It is desirable that these optical imaging systems have a large FOR during as short a period as possible.

Since these large telescopes are mounted on a gimbal to allow freedom of motion, when the telescopes are moved quickly over a scene of interest, the spacecraft experiences vibration that must be compensated for. In general, a control loop system detects the direction of the vibration and provides a signal to compensate for the vibration in an opposite direction. The compensation is accomplished by using primary power that effectively shortens the life time of the instrument.

Another concern with these optical imaging systems is the focal plane of the telescope. Light received by the telescope is focused onto a focal plane array having many detectors, which convert the light into electrical signals. These electrical signals must be transferred from each of the detectors to various signal processors via discrete wires. These wires add unwanted mass and, more importantly, reduce the speed of movement of the telescope and increase signal noise between the focal plane array and the signal processors. The wires must be separated by electrical contacts inside the gimbaled platform in order to allow the two axes of rotation typically provided by gimbaled platform.

Referring now to FIG. 1, there is shown a conventional gimbaled optical imaging system 300. The imaging system includes telescope 310 mounted on gimbaled system 320, where the latter, in turn, is mounted on spacecraft 330. The telescope receives light through aperture 312. The light is focused onto detectors 314 located at the focal plane of telescope 310. The gimbaled system includes two sets of gimbals, 320 and 322. Gimbals 322 allow the telescope to rotate between 0 and 90 degrees on an elevation axis. Gimbals 324, which are attached to gimbals 320, allow telescope 310 to rotate 360 degrees around an azimuth axis. By rotating telescope 310 around the azimuth and elevation axes, a large FOR may be achieved.

The signals from detectors 314 must be transferred to the signal processors (not shown) on spacecraft 330. To accomplish this, many discrete wires carry the signals from the detectors to the signal processors. These wires must pass through many contacts between one gimbaled axis and the other gimbaled axis to permit the two-axes of rotation for the telescope. These contacts are difficult to design and add signal noise to the optical image produced by the image processors.

In addition, the gimbaled movement of telescope 310 requires considerable amounts of energy, since the telescope is very heavy. Furthermore, the system requires considerable amounts of energy to compensate for the vibration effects produced by the motion of the telescope.

One solution that has been proposed to the problem of wires passing between moving gimbals is the use of a Coude path system. In the Coude path system, the detectors of the telescope are not positioned at the back of the telescope, rather they are located in the spacecraft but are away from the telescope. Thus, light received by the telescope is permitted to pass through hollow portions in the gimbals using a series of mirrors in the Coude path system. The light eventually arrives at the focal plane array which is positioned apart from the telescope.

This solution alleviates the problems presented by having wires connecting the detectors and the signal processors. However, this solution does not address the problems created by having to compensate for the vibration and signal noise produced by moving the telescope. Furthermore, the Coude path system reduces the FOV of the telescope and increases the amount of time the telescope requires to scan the FOR.

The present invention, as will be described, provides a system and method of accomplishing the two basic goals for space borne optical imaging systems. The present invention provides for an optical imaging system that requires less inertial corrections and, thereby, allows the system to consume less power. The present invention also eliminates the need for gimbaled platforms, thereby allowing for a lighter spacecraft. At the same time, the present invention does not sacrifice the large FOR or the quality of the final image produced. The present invention is described below.

SUMMARY OF THE INVENTION

To meet this and other needs, and in view of its purposes, the present is invention provides an optical imaging system including a non-gimbaled telescope attached to a platform configured for outer-space orbit. Also attached to the platform is a coelostat that is positioned in front of the aperture of the telescope. The coelostat includes two mirrors. Mirror one receives light from a scene of interest and transfers that light to mirror two. Mirror two receives light from the first mirror and transfers that light to the aperture of the telescope. The first and second mirrors are connected together and rotate 360 degrees around the azimuth axis. Additionally, the first mirror rotates at least 45 degrees around the elevational axis to provide the entire system with a large field of regard. This large field of regard is achieved without any movement of the telescope.

In the present invention, the telescope includes an optical axis that is oriented in the azimuth axis for collecting the light through the aperture. In some optical imaging systems, the telescope payload is greater than 500 pounds. The aperture and the focal plane array are disposed in the telescope. Additionally, the focal plane array may be cooled to cryogenic temperatures. In the present invention, the field of regard is at least 100 times greater than the field of view of the telescope.

It is understood that the foregoing general description and the following detailed description are exemplary, but not restrictive, of the invention.

BRIEF DESCRIPTION OF THE FIGURES

The invention may best be understood from the following detailed description when read in connection with the following figures.

DETAILED DESCRIPTION OF THE INVENTION

The present invention fixes a telescope directly to the spacecraft, and eliminates the need for a gimbaled system. The present invention reduces the amount of power required to move the telescope to produce a large FOR. By fixing the telescope to the spacecraft, imaging quality is improved and minimal power is wasted. The present invention utilizes a coelostat that rapidly moves in space and provides a large FOR to a stationary telescope. The coelostat provides a Line of Sight (hereinafter "LOS") that rotates 360 degrees in azimuth and up to 90 degrees in elevation with minimal mass, power and impact on the spacecraft.

In one exemplary embodiment, the coelostat/telescope system may have a mass reduction of 40% to 60% over its gimbaled counterpart. Furthermore, in one exemplary embodiment, the coelostat/telescope system may reduce the power required to cover the hemispherical FOR by 70% to 80%. Finally, in one exemplary embodiment, the coelostat/telescope system may reduce the inertial impact on the spacecraft by 65% to 75%. These advantages are significant over conventional gimbaled optical imaging systems. The reductions in power allow for a longer lifetime for the optical imaging system and reduces the cost of launching the optical imaging system into space. The achieved reductions in mass, power, and inertia do not compromise image quality or the FOR of the optical imaging system.

Figure 1:
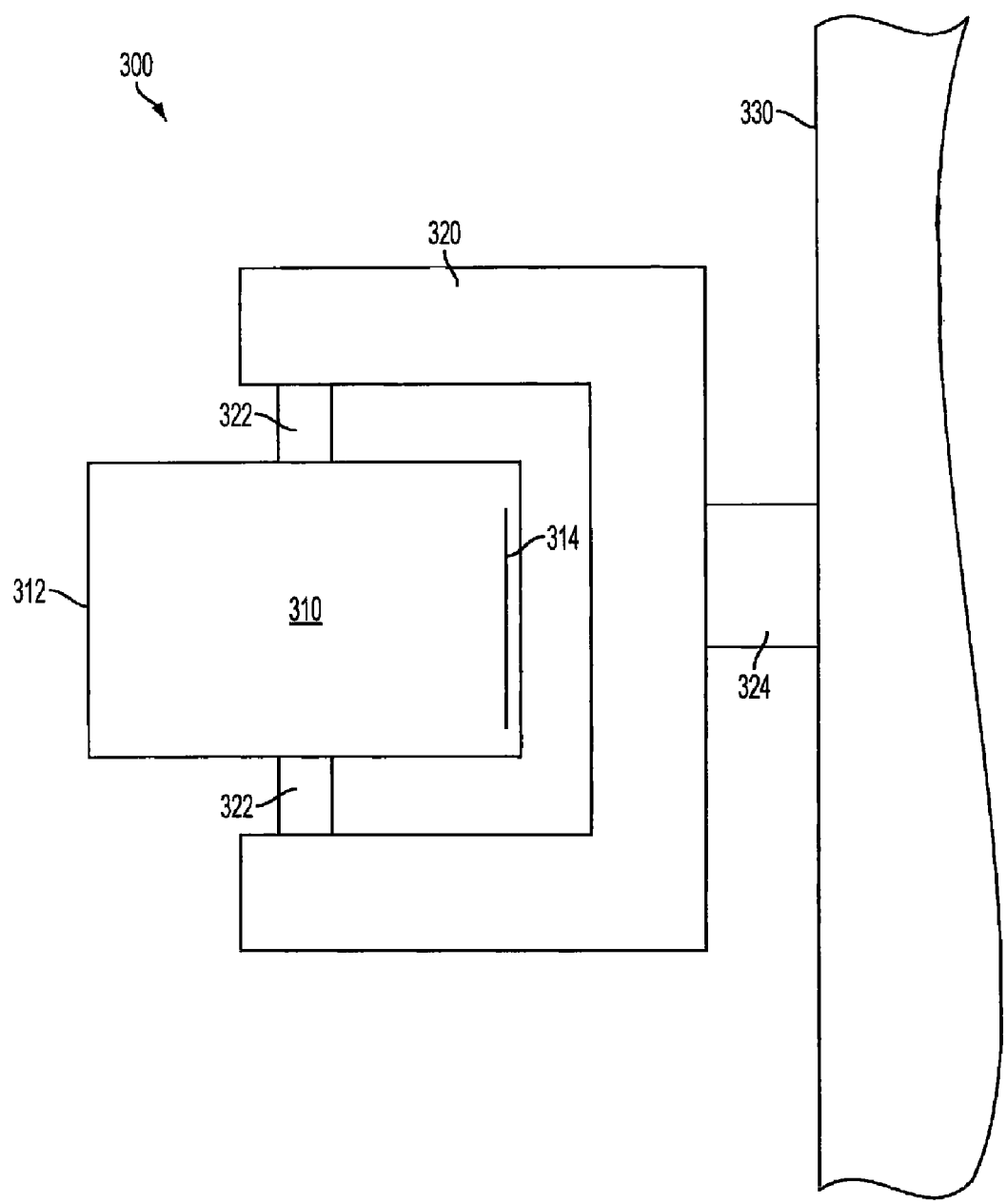
FIG. 1 is a schematic view of a gimbaled telescope known in the prior art.
Figure 2:
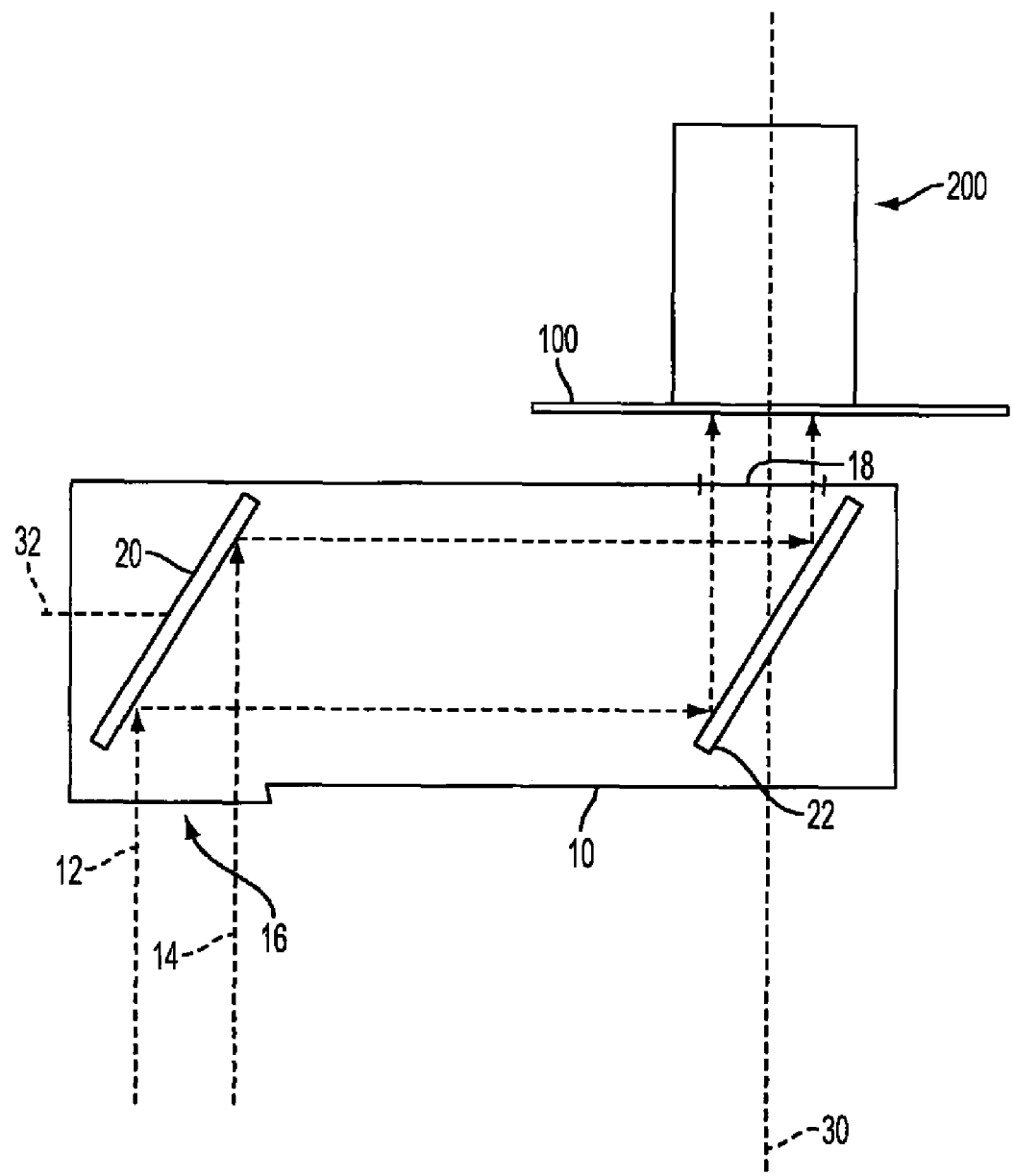
FIG. 2 is a schematic view of an optical imaging system including a coelostat with a telescope fixed to the spacecraft, in accordance with an embodiment of the present invention.
Figure 3:
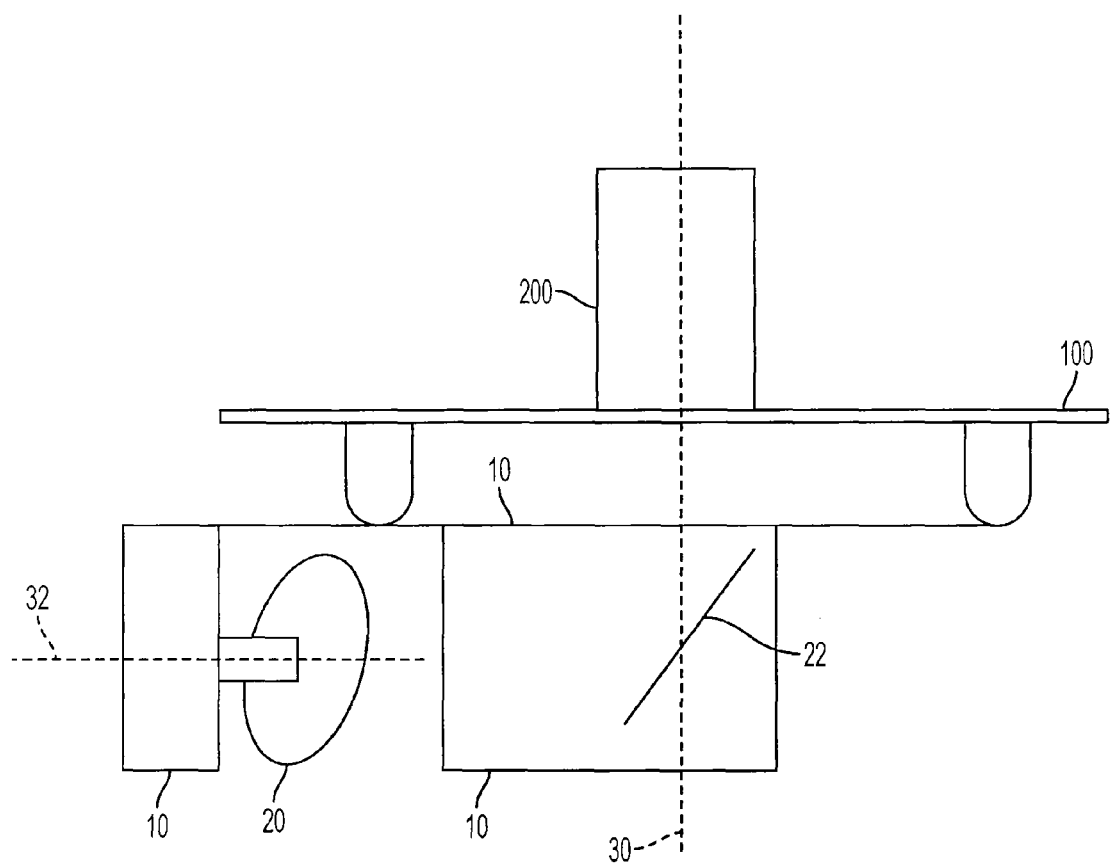
FIG. 3 is another schematic view of the optical imaging system shown in FIG. 2.

Referring now to FIGS. 2 and 3, coelostat structure 10 is included in spacecraft 100. Also included is telescope 200 which is hard-mounted to spacecraft 100 without any gimbaled structures. The telescope also includes optical detectors (not shown) which may now transfer the electrical signals to the signal processors without worrying how to move signals through a rotating gimbaled platform.

Telescope 200 receives light outlined by paths 12, 14. The light enters the coelostat structure at opening 16 and is reflected by mirror 20 along the inner path of coelostat structure 10. The path of the light then travels from mirror 20 to mirror 22, both disposed in the coelostat structure. Mirror 22 reflects the light through coelostat exit 18. After passing through coelostat exit 18, the light is received by telescope 200.

Referring to FIG. 2, mirrors 20 and 22 are physically connected to each other, each tilted at 45 degrees. Coelostat structure 10 may be rotated 360 degrees around azimuth axis 30. By rotating the coelostat structure, mirrors 20 and 22 are also rotated 360 degrees around the azimuth axis.

Referring now to FIG. 3, mirror 20 is shown rotating about elevation axis 32. By rotating mirror 20 along the elevation axis, the LOS of telescope 200 is effectively moved between 0 and 90 degrees in elevation, in addition to rotating 360 degrees in azimuth.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An optical imaging system comprising:
    a platform configured for an outer-space orbit;
    a telescope bolted to the platform for collecting light from a scene-of-interest viewed through an aperture, and focusing the collected light onto a focal plane array;
    a coelostat positioned in front of the aperture configured to provide a field-of-regard (FOR) that is larger than a field-of-view of the telescope;
    wherein the telescope is bolted to the platform and is not-gimbaled;
    the coelostat includes a first mirror for viewing the scene-of-interest and a second mirror for receiving light from the first mirror and transmitting the light to the aperture for collection by the telescope;
    the telescope includes an optical axis oriented in an azimuth axis for collecting the light through the aperture;
    the second mirror is oriented in front of the aperture and configured to rotate in the azimuth axis; and
    the first mirror is configured to rotate in an elevation axis.

2. The optical imaging system of claim 1 wherein
    the telescope includes a payload larger than 500 pounds.

3. The optical imaging system of claim 1 wherein
    the focal plane array is cooled to cryogenic temperatures.

4. The optical imaging system of claim 1 wherein
    the second mirror rotates 360 degrees in the azimuth axis; and
    the first mirror rotates at least 45 degrees in the elevation axis.

5. The optical imaging system of claim 4 wherein
    the first and second mirrors are connected to each other; and
    the first mirror is configured to rotate together with the second mirror in the azimuth axis.

6. The optical imaging system of claim 1 wherein
    the aperture and the focal plane array are disposed in the telescope; and
    the focal plane array receives the light directly from the aperture.

7. The optical imaging system of claim 1 wherein
    the coelostat is configured for rotating about an azimuth axis centered on an optical axis of the aperture; and
    the FOR of the telescope is at least 100 times greater than the FOV of the telescope.

8. A large field-of-regard (FOR) optical imaging system comprising:
    a telescope for viewing a scene-of-interest from outer-space;

the telescope including a large collecting aperture and a focal plane array; both oriented along the same optical axis;

a space-platform for orbiting a planet and housing the telescope;

the space-platform configured to provide a fixed-mount for the telescope; and a coelostat including first and second mirrors;

wherein the first mirror is configured to view the scene-of-interest and reflect light from the scene-of-interest to the second mirror;

the second mirror is disposed in front of the large collecting aperture and oriented to receive the light from the first mirror and reflect the light toward the large collecting aperture along the same optical axis;

the coelostat is configured for rotating about an azimuth axis centered on an optical axis of the aperture; and the FOR of the telescope is at least 100 times greater than the FOV of the telescope.

9. The large FOR optical imaging system of claim 8 wherein the telescope is directly mounted to the space-platform and is non-gimbaled.

10. The large FOR optical imaging system of claim 8 wherein the telescope includes a payload of at least 500 pounds.

11. A method of imaging a scene of interest using a telescope disposed in a spacecraft, comprising the steps of:

bolting the telescope to the spacecraft;

positioning a coelostat in front of the telescope;

rotating the coelostat to receive light from the scene-of-interest;

transmitting the received light to the telescope; and directing the light to a focal plane array in the telescope, without moving the telescope;

wherein positioning includes positioning a first mirror for viewing the scene-of-interest; and positioning a second mirror for receiving light from the first mirror and transmitting the light to an aperture of the telescope; and an optical axis is oriented in an azimuth axis for collecting the light through the aperture of the telescope and transmitting the light to the focal plane array disposed inside the telescope.

12. The method of claim 11 wherein bolting includes mounting the telescope without using gimbals.

13. The method of claim 11 further comprising cooling the focal plane array to cryogenic temperatures.

14. The method of claim 11 further comprising positioning the second mirror in front of the aperture of the telescope and rotating the second mirror 360 degrees about the azimuth axis.

15. The method of claim 14 further comprising positioning the first mirror relative to the second mirror and rotating the first mirror at least 45 degrees about an elevation axis.

16. The method of claim 15 further comprising configuring the first mirror to rotate together with the second mirror about the azimuth axis.

17. The method of claim 11 wherein bolting includes hard-mounting the telescope having a weight of at least 500 pounds.

* * * * *